United States Patent
Kling

[19]

[11] Patent Number: 5,985,065
[45] Date of Patent: Nov. 16, 1999

[54] METHOD OF WELDING OR CUTTING MATERIAL ULTRASONICALLY

[75] Inventor: Robert Kling, Skene, Sweden

[73] Assignee: SCA Hygiene Products AB, Gothenburg, Sweden

[21] Appl. No.: 09/091,189

[22] PCT Filed: Nov. 26, 1996

[86] PCT No.: PCT/SE96/01547

§ 371 Date: Jun. 10, 1998

§ 102(e) Date: Jun. 10, 1998

[87] PCT Pub. No.: WO97/21535

PCT Pub. Date: Jun. 19, 1997

[30] Foreign Application Priority Data

Dec. 11, 1995 [SE] Sweden ................................. 9504424

[51] Int. Cl.[6] .................................................. B29C 65/08
[52] U.S. Cl. ........................ 156/73.3; 156/73.1; 156/251; 156/515; 156/580.1; 156/580.2
[58] Field of Search ................................. 156/73.1, 73.3, 156/251, 515, 580.1, 580.2; 264/442, 443, 444; 425/174.2

[56] References Cited

U.S. PATENT DOCUMENTS

| 3,242,029 | 3/1966 | Deans ..................................... 156/580.2 |
|---|---|---|
| 3,939,033 | 2/1976 | Grgach et al. ........................... 156/515 |
| 3,993,532 | 11/1976 | McDonald et al. .................. 156/580.2 |
| 4,430,148 | 2/1984 | Schaefer ................................ 156/580.2 |
| 4,531,999 | 7/1985 | Persson et al. ....................... 156/580.2 |
| 4,690,722 | 9/1987 | Flood ...................................... 156/510 |
| 4,711,693 | 12/1987 | Holze, Jr. ............................... 156/580.1 |
| 4,747,895 | 5/1988 | Wallerstein et al. ................... 156/73.3 |
| 5,198,056 | 3/1993 | Stöckli et al. .......................... 156/73.1 |
| 5,840,154 | 11/1998 | Wittmaier ............................. 156/580.2 |

FOREIGN PATENT DOCUMENTS 639 593   11/1983   Switzerland .

Primary Examiner—James Sells
Attorney, Agent, or Firm—Burns, Doane, Swecker & Mathis, L.L.P.

[57] ABSTRACT

The present invention relates to a method of welding or cutting material ultrasonically while avoiding hammering motion between ultrasonic anvil and ultrasonic horn, so-called cobblestoning. The material web is welded or cut generally transversely to its direction of movement, wherein at least one elongated ultrasonic horn is positioned obliquely to the direction of web movement, and at least on anvil corresponding to the ultrasonic horn is arranged on a rotatable cylinder whose rotational axis is essentially parallel with the longitudinal axis of the ultrasonic horn.

6 Claims, 1 Drawing Sheet

5,985,065

METHOD OF WELDING OR CUTTING MATERIAL ULTRASONICALLY

BACKGROUND OF THE INVENTION

The present invention relates to an apparatus for ultrasonically welding or cutting a moving web of material generally transversely to its the direction of movement, comprising at least one elongated ultrasonic horn and at least one anvil corresponding to said horn, the web being moved between the at least one horn and the at least one corresponding anvil. The invention also relates to a method of ultrasonic welding or cutting such a web.

TECHNICAL BACKGROUND

Many different types of apparatus for welding or cutting material ultrasonically are available commercially. A common feature of these apparatus is that they include one or more ultrasonic horns which emit high frequency sound waves, and ultrasonic anvil surfaces positioned opposite respective horns. The material is worked in the manner desired, by moving or otherwise placing said material between the ultrasonic horns and opposing anvil surfaces. It is common procedure to use ultrasound when laminating and patterning thermoplastic material. In this regard, there are often used cylinders or drums that are provided with a number of raised surfaces which function as anvils and which as the cylinder/drum rotates punctiform welds, linear welds, etc., in coaction with one or more ultrasonic horns. Desired weld patterns and weld distribution are achieved by giving the raised surfaces different positions, sizes, shapes, etc. The raised surfaces may also be replaced with comb-like elements, so as to obtain continuous welds. When wishing to make holes in the material or to clip or cut the material, this can be best achieved by increasing the power of the ultrasound generating unit. EP 0,092,866 describes apparatus for bonding together several layers of material to form a laminate structure by means of ultrasound, wherein the ultrasonic anvil surfaces may have any one of the aforesaid forms, among other things.

TECHNICAL PROBLEMS

One problem experienced with ultrasonic welding in which several different materials are joined together with the aid of cylinders provided with a plurality of ultrasonic anvils in accordance with the above, resides in the occurrence of so-called cobblestoning, i.e. hammering motion between ultrasonic horn and anvil caused by variation in the abutment pressure therebetween. In addition to resulting in a poorer weld quality, cobblestoning also increases the wear on the ultrasonic horn, primarily punctiform wear. EP 0,092,866 describes how at least one anvil surface can be held in firm abutment with the ultrasonic horn as the cylinder rotates, by relative distribution of such anvils on a rotatable cylinder. In this way, there is obtained a constant total abutment pressure between the ultrasonic horn and the anvil surfaces carried by the cylinder. Cobblestoning is counteracted in this way. Although the wear problem is alleviated to some extent it is not resolved completely, because the pressure exerted per unit area on the ultrasonic horn varies as the cylinder rotates and the anvils pass the horn. When the abutment surface between horn and anvil varies in magnitude as the cylinder rotates, the ultrasonic energy delivered per unit area will normally also vary, resulting in welds of varying quality. Even though attempts have been made to avoid this problem with the aid of electronic control units, the energy delivered is still able to increase momentarily and therewith influence the weld quality. Large variations in power outtake will occur particularly when welding or cutting transversely to the direction of web movement, wherewith anvil and horn will lie against one another during short repeated points in time along the whole of their respective lengths, i.e. with large variations in said abutment surface. One result of this variation is the necessity to restrict the speed of the web.

SUMMARY OF THE INVENTION

The object of the present invention is to eliminate the aforesaid problems. The present invention provides an apparatus and a method of welding or cutting a moving web of material transversely to its movement direction with the aid of ultrasonic means. According to a first embodiment of the invention, an abutment surface of essentially constant size is obtained during the entire welding or cutting procedure, therewith avoiding the earlier mentioned problems relating to power outtake and punctiform wear. This is achieved by positioning an ultrasonic horn obliquely to the web of material to be worked, and by positioning a cylinder carrying ultrasonic anvil surfaces with its rotational axis parallel with the longitudinal axis of the horn, such that the web will travel therebetween. The anvil surface extends helically on the cylinder. The pitch of the helix is adapted so that the abutment surface between ultrasonic horn and said helically extending anvil will move successively along the entire length of the horn as the cylinder rotates with a peripheral speed which is adapted so that the speed of the anvil surface at the welding point will coincide with movement of the web. By adapting the obliqueness of the ultrasonic horn and said cylinder to the direction of movement of the web, and by selecting a commensurate pitch with regard to the helically extending anvil surface, the desired weld, or cut, can be made transversely to the movement direction of the web. In a second embodiment of the invention which is primarily intended to enable the speed of the web to be increased, the anvil is undoubtedly slightly helical, but constant contact between horn and anvil is not necessary.

DETAILED DESCRIPTION OF THE INVENTION

The method is based on the basic concept of maintaining a constant pressure between horn and anvil and a contact surface therebetween of constant size when welding or cutting material ultrasonically. By this is meant a constant total pressure and constant pressure per unit of area. The invention reduces the risk of uneven wear, uneven energy consumption and so-called cobblestoning, i.e. a hammering motion between horn and anvil. The invention also enables material to be worked more quickly, by extending the treatment time per unit of area, which also reduces the energy consumption per unit of time.

Figure 1:
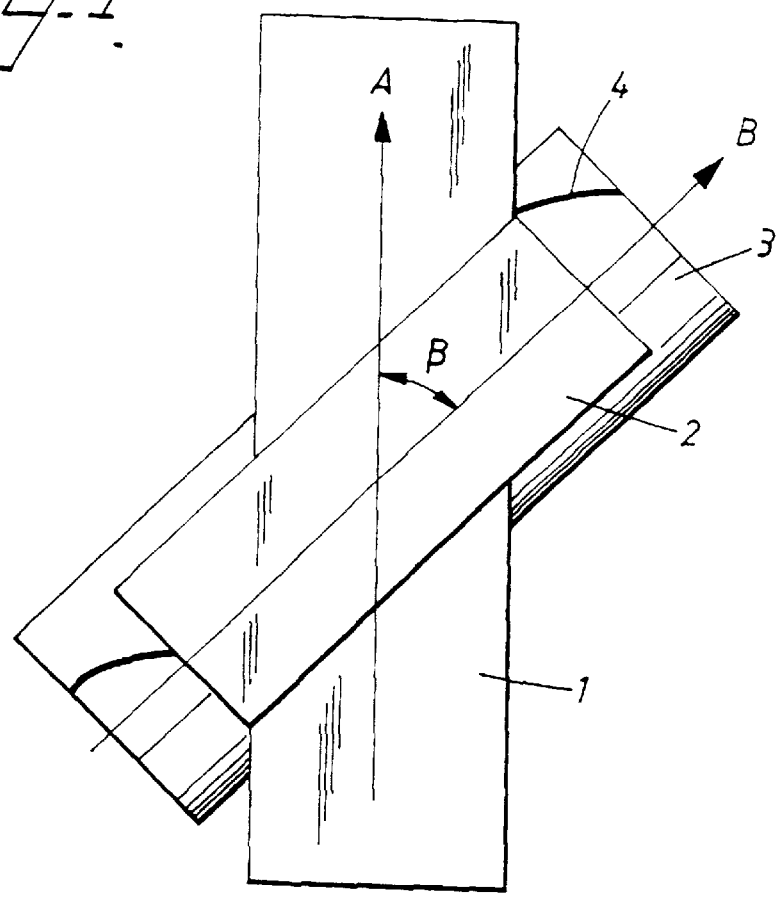
FIG. 1 is a view from above of one embodiment of the present invention.

The invention illustrated by a preferred embodiment in the accompanying Figures is easiest described with reference to the reference signs used. Thus, reference numeral 1 identifies a web of material in which a weld or a cut is to be made. The weld or cut is desired preferably transversely to the movement direction of the web 1, as symbolized with the arrow A. The FIG. 1 embodiment also includes an elongated ultrasonic horn 2, the extension of which is generally indicated by the arrow B. A cylinder 3 carrying a ultrasonic anvil 4 is placed parallel with the ultrasonic horn 2. The rotational axis of the cylinder is referenced B'. The axes A and B define therebetween an angle β, this angle, naturally, being the same as the angle defined by A and B'. The angle β is chosen within the range 10°≦β≦80°, or within the range 100°≦β≦170°, preferably within the range 30°≦β≦60° or 120°≦β≦150° respectively.

Figure 2:
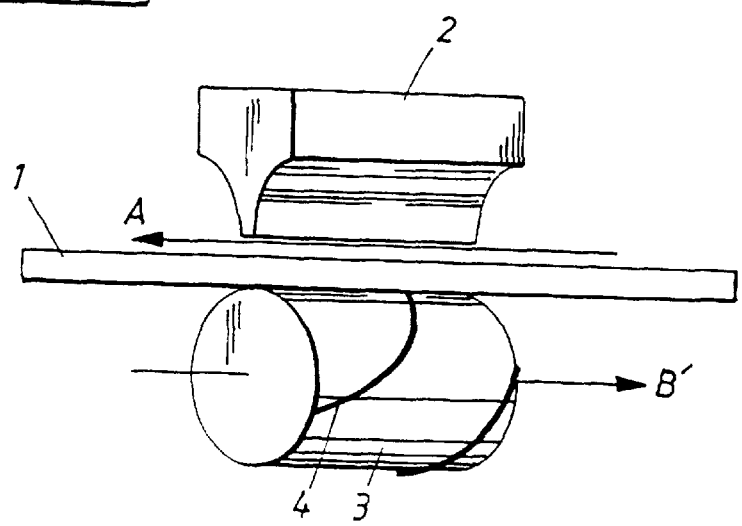
FIG. 2 is a side view of one embodiment of a cylinder provided with ultrasonic anvils in accordance with the invention.

FIG. 2 illustrates the cylinder 3 carrying the anvil 4. The anvil 4 has a generally helical form in the longitudinal direction of the cylinder 3, i.e. extends helically on the outer cylindrical surface of said cylinder. Analogously, the anvil surface 4 has a generally constant pitch and describes a complete screw-turn, in other words extends helically around the cylinder 3 through 360°. As before mentioned, the ultrasonic horn 2 and the cylinder 3 are both positioned so that their mutually longitudinal axes will define an angle β and β' respectively in relation to the movement direction A of the web 1. When the angle β and β' are adapted to the pitch of the helical anvil 4 and the rotational speed of the cylinder 3 is adapted to the speed at which the web 1 moves, the peripheral speed of the cylinder 3 will be such that the speed of the anvil 4 at the welding point will coincide essentially with the speed of the web 1 and the ultrasonic welding process will take place at a point which moves successively along the full length of the horn 2 and along the full length of the anvil 4 as the cylinder 3 rotates. In other words, the point of abutment between the horn 2 and the anvil 4 will wander successively from left to right as the cylinder 3 rotates, as evident from FIG. 1. Consequently, a weld, or cut, will be formed, or made, in a direction transversely to the movement direction A of the web 1. The anvil 4 extends helically through 360°, i.e. the anvil 4 will constantly be in abutment with the horn 2 at one point or another throughout one full revolution of the outer surface of the cylinder 3, therewith maintaining a contact surface of constant size between the horn and the anvil and also a constant abutment pressure force. This embodiment also provides a desired spacing between transversal welds or cuts, preferably by selection of a cylinder 3 whose outer surface is adapted to this spacing. According to another embodiment of the invention, the anvil 4 has a similar helical configuration although in the case the helix extends only through part of one revolution of the outer surface of the cylinder. The angle β and β', however, are such that when a is the distance travelled by the web 1 in the movement direction A of the web during the same time as the weld, or cut, is made across the web with a width b, then Tan β=b/a. Naturally, Tan β' will also equal b/a.

It will be understood that the invention is not restricted to the aforedescribed and illustrated exemplifying embodiment thereof and that other embodiments are conceivable within the scope of the inventive concept. For instance, the angle β and β' can be chosen to produce welds or cuts which extend essentially obliquely across the web. The anvil 4 on the cylinder 3 may also be given a pitch which is not constant, so as to obtain non-linear welds or cuts. It is also conceivable to use a cylinder 3 that has more than one helically extending anvil 4, particularly when desiring a small spacing between the welds or cuts. In this way, a low cylinder-rotational speed is also obtained. Combinations of welds, optionally of different configurations, can also be obtained by providing the cylinder 3 with more anvil surfaces 4.

I claim:

1. A method of ultrasonically welding or cutting a web (1) moving between at least one elongated ultrasonic horn (2) and at least one corresponding anvil (4) generally transversely to its direction of movement (A), each elongated ultrasonic horn (2) being placed at an oblique angle (β) to said direction of web movement (A) and each anvil (4) being arranged on a rotatable cylinder (3) whose rotational axis (B') is generally parallel with the longitudinal axis (B) of the horn (2), characterized by adapting the rotational speed of the cylinder (3) to the speed of the web (1), so that the peripheral speed of the cylinder (3) is such that the speed of the anvil (4) at the welding point coincides with the speed of the web (1).

2. A method according to claim 1, the at least one anvil extending helically along the cylinder (3), characterized by adapting the obliqueness of the horn (2) and the anvil-carrying cylinder (3) such as to form the angle (β) in relation to the movement direction (A) of the web (1) to the helical pitch of the anvil (4) so that the point of abutment between the horn (2) and the anvil (4) will move successively along the length of the horn (2) and the anvil (4) during a welding or cutting process, said welding or cutting process being effected essentially transversely to the movement direction (A) of the web (1).

3. A method according claim 2, characterized by controlling the distance between two mutually sequential welds or cuts in said web (1) by selection of the radius of the anvil-carrying cylinder (3) and the number of anvils (4) carried thereby.

4. An apparatus for ultrasonically welding or cutting a moving web (1) of material generally transversely to its direction of movement (A), comprising at least one elongated ultrasonic horn (2) and at least one anvil (4) corresponding to said horn, the web being moved between the at least one horn and the at least one corresponding anvil, characterized in that the at least one elongated ultrasonic horn (2) is placed at an oblique angle (β) to said direction of web movement (A), and in that the corresponding at least one anvil (4) is arranged on a rotatable cylinder (3) whose rotational axis (B') is generally parallel with the longitudinal axis (B) of the horn (2).

5. An apparatus according to claim 4, characterized in that the at least one anvil (4) is extended helically along the cylinder (3) with a constant pitch in the direction of the rotational axis (B') of the cylinder.

6. An apparatus according to claim 4, characterized in that the at least one anvil (4) is extended helically along the cylinder (3) with an inconstant pitch in the direction of the rotational axis (B') of the cylinder.

* * * * *